(12) United States Patent
Khawand et al.

(10) Patent No.: US 7,876,837 B2
(45) Date of Patent: Jan. 25, 2011

(54) METHOD FOR REDUCING ACCESS NOISE IN A SPREAD SPECTRUM COMMUNICATION SYSTEM

(75) Inventors: Charbel Khawand, Miami, FL (US); Jean Khawand, Miami, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 10/261,260

(22) Filed: Sep. 30, 2002

(65) Prior Publication Data

US 2004/0062295 A1    Apr. 1, 2004

(51) Int. Cl.
*H04B 1/00* (2006.01)
(52) U.S. Cl. .................... 375/260; 370/229; 455/422.1; 455/515
(58) Field of Classification Search ................. 455/422, 455/512, 422.1; 375/130; 370/229
See application file for complete search history.

(56) References Cited

U.S. PATENT DOCUMENTS

| | | | | |
|---|---|---|---|---|
| 80,745 | A * | 8/1868 | Dick et al. .................. 370/335 |
| 125,060 | A * | 3/1872 | Kim et al. ................... 455/512 |
| 4,977,612 | A * | 12/1990 | Wilson .................... 455/166.1 |
| 5,021,777 | A * | 6/1991 | Gross et al. .............. 340/10.51 |
| 5,282,204 | A * | 1/1994 | Shpancer et al. ........... 370/341 |
| 5,309,503 | A * | 5/1994 | Bruckert et al. .......... 455/452.2 |
| 5,345,597 | A * | 9/1994 | Strawczynski et al. ...... 455/450 |
| 5,574,721 | A | 11/1996 | Magill |
| 5,721,923 | A * | 2/1998 | Hamilton .................... 718/104 |
| 5,867,785 | A * | 2/1999 | Averbuch et al. ............ 455/436 |
| 5,933,425 | A * | 8/1999 | Iwata ......................... 370/351 |
| 5,970,056 | A * | 10/1999 | Brailean et al. ............. 370/296 |
| 6,094,576 | A * | 7/2000 | Hakkinen et al. ......... 455/422.1 |
| 6,131,027 | A * | 10/2000 | Armbruster et al. ......... 455/428 |
| 6,192,252 | B1 * | 2/2001 | Lysejko et al. .............. 455/512 |
| 6,195,327 | B1 | 2/2001 | Lysejko et al. |
| 6,337,985 | B1 | 1/2002 | Roux et al. |
| 6,480,525 | B1 * | 11/2002 | Parsa et al. .................. 375/141 |
| 6,584,071 | B1 * | 6/2003 | Kodialam et al. ........... 370/238 |
| 6,694,469 | B1 * | 2/2004 | Jalali et al. .................. 714/748 |
| 6,711,403 | B1 * | 3/2004 | Herrmann et al. ........ 455/422.1 |
| 6,731,740 | B1 * | 5/2004 | Choudhury et al. .... 379/221.03 |
| 6,744,743 | B2 * | 6/2004 | Walton et al. ............... 370/318 |

(Continued)

FOREIGN PATENT DOCUMENTS

EP    1213868 B1    10/2003

(Continued)

OTHER PUBLICATIONS

U.S. Appl. No. 09/847,860, filed Nov. 2002, Alapuranen et al.*

(Continued)

*Primary Examiner*—Jean B Corrielus

(57) ABSTRACT

Access noise in a spread spectrum communication system (100) is reduced by broadcasting a resource indicator message (116) from a base station (102) and is received by mobile stations (104) in the serving area (103) of the base station. The resource indicator message indicates which resources are supported (202) by the base station, as well as their present availability (204, 206, 208, 210). If a desired resource is not presently available (408), mobile stations will avoid requesting access to that resource (410). When the resource becomes available, access noise can be controlled by having mobile stations wait a randomly selected period of time (414).

19 Claims, 2 Drawing Sheets

U.S. PATENT DOCUMENTS

| | | | |
|---|---|---|---|
| 6,850,504 | B1 * | 2/2005 | Cao et al. ................... 370/335 |
| 6,999,438 | B2 * | 2/2006 | Nounin et al. .............. 370/332 |
| 2002/0080745 | A1 | 6/2002 | Dick et al. |
| 2002/0080765 | A1 * | 6/2002 | Dick et al. ................... 370/335 |
| 2002/0102981 | A1 * | 8/2002 | Jechoux ...................... 455/450 |
| 2002/0173311 | A1 * | 11/2002 | Biggs et al. ................. 455/450 |
| 2003/0231586 | A1 * | 12/2003 | Chheda ...................... 370/230 |
| 2007/0070977 | A1 * | 3/2007 | Kimura et al. .............. 370/351 |
| 2007/0184839 | A1 * | 8/2007 | Igarashi et al. .............. 455/436 |
| 2007/0249363 | A1 * | 10/2007 | Amalfitano et al. ......... 455/453 |

FOREIGN PATENT DOCUMENTS

| | | |
|---|---|---|
| GB | 2343089 A | 4/2000 |
| KR | 20000055403 (A) | 9/2000 |
| KR | 20030044560 (A) | 12/2005 |
| KR | 20030044660 (A) | 12/2006 |
| WO | 0007401 A1 | 2/2000 |
| WO | 0110158 A1 | 2/2001 |
| WO | WO 01/10157 A1 | 2/2001 |
| WO | 2004032359 A1 | 4/2004 |

OTHER PUBLICATIONS

Notice of Preliminary Rejection received from the Korean Intellectual Property on Aug. 18, 2006 for Application No. 10-2005-7005527 for the Invention entitled "Method for Reducing Access Noise in a Spread Spectrum Communication System" (3 pages).

Patent Office of the People's Republic of China; Notification of the First Office Action dated Jan. 12, 2007 for Application No. 03824486.1 entitled "Method for Reducing Access Noise in a Spread Spectrum Communication System" (9 pages).

Patent Office of the People's Republic of China; Notification of the Second Office Action dated Oct. 10, 2008 for Application No. 03824486.1 entitled "Method for Reducing Access Noise in a Spread Spectrum Communication System" (10 pages).

Patent Office of the People's Republic of China; Notification of the Third Office Action dated Apr. 10, 2009 for counterpart Application No. 03824486.1 entitled "Method for Reducing Access Noise in a Spread Spectrum Communication System" (7 pages).

European Patent Office, "Communication", Mar. 2, 2009, pp. 1-3, European Pat. Appln. No. 03754975.5, Berlin, Germany

* cited by examiner

| 202 | 204 | 206 | 208 | 210 |
|---|---|---|---|---|
| ID | CHANNELS | DELAY | THROUGHPUT | PACKET LOSS |
| 0 | $C_0$ | $D_0$ | $B_0$ | $L_0$ |
| 1 | $C_1$ | $D_1$ | $B_1$ | $L_1$ |
| 2 | $C_2$ | $D_2$ | $B_2$ | $L_2$ |
| 3 | $C_3$ | $D_3$ | $B_3$ | $L_3$ |

METHOD FOR REDUCING ACCESS NOISE IN A SPREAD SPECTRUM COMMUNICATION SYSTEM

TECHNICAL FIELD

This invention relates in general to spread spectrum communication systems, and in particular to reducing noise associated with mobile stations attempting to access communication resources in a spread spectrum communication system.

BACKGROUND OF THE INVENTION

In any mobile communication system, channel capacity and communication resource availability are a concern for both the system operator and mobile users. Mobile users desire to have readily available access to communication resources, and system operators want to maintain a level of quality in the communication resources it offers so that, even when a particular cell or serving area is operating at capacity, other users in the serving area who desire access to communication resources do not interfere with users presently using communication resources.

Access noise is the noise generated by users seeking access to communication resources in spread spectrum communication systems. The noise comes from the imperfect orthogonality of the spreading codes used in these systems and, in particular, at two times namely, when mobile stations request access to communication resources and when mobile stations negotiate for particular communication resources. A mobile station may request access and, upon negotiation for a particular quality of service, find the desired resource is not available. The process of negotiating and ultimately failing to obtain the desired communication resource adds noise to the other channels.

In general the noise effect of imperfect orthoganality has been addressed in the past by techniques such as discontinuous receive and transmit. In each of these techniques, when a transmitter has no information to transmit, such as when a user of the communication transceiver is not presently speaking, the transceiver doesn't transmit anything. On average these techniques reduce the noise each channel experiences. However, conventional spread spectrum communication systems all require mobile stations to request and negotiate service, whether such service is available or not, and this access noise is not addressed by discontinuous transmit techniques. Therefore there is a need for a way by which access noise can be reduced.

DETAILED DESCRIPTION OF A PREFERRED EMBODIMENT

Figures 1, 2:
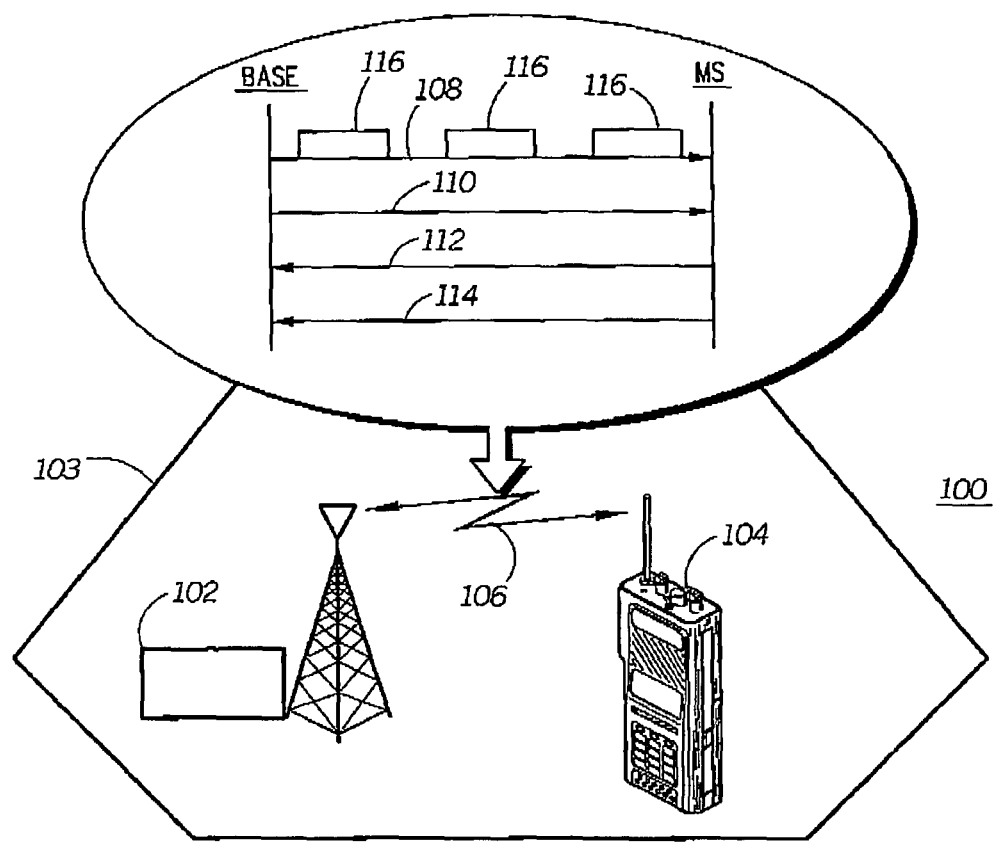
FIG. 1 shows a system diagram of a mobile communication system, in accordance with the invention.
FIG. 2 shows a chart diagram illustrating information that may be transmitted in a resource indicator message, in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem by providing a new broadcast message that indicates what resources are supported by a particular serving cell, and the present availability of those resources. Mobile stations in the serving cell receive the broadcast message and when the communication resource desired is available the mobile station commences requesting access to the desired communication resource. In addition, if one mobile station is seeking access to communication resources, it is likely that other mobile stations in the serving area may be contending for the same communication resources. Since a mobile station has no way of knowing how many other mobile stations may be contending for the same resource, the sudden availability of a resource, as indicated by the broadcast message, may trigger more mobile stations than there are resources available to attempt to access the resource. Therefore, the invention also provides for a method where accessing is controlled such that even when an in demand resource becomes available, mobile stations in the serving area self-randomize access requests to avoid a sudden deluge of access requests.

Referring now to FIG. 1, there is shown a system diagram 200 of a mobile communication system, in accordance with the invention. A base station 102 provides communication resources in a serving cell or serving area 103. A mobile station 104 in the serving area interacts with the base station, 102 according to an air interface 106, which specifies frequencies, spreading codes, and so on, as is known in a spread spectrum communication system such as a code division multiple access (CDMA) system or a wideband code division multiple access system (WCDMA), for example. A typical air interface includes a broadcast control channel 108, downlink traffic channel 110, uplink traffic channel 112, and a random access channel 114. The broadcast control channel is a channel received by all mobile stations in the serving cell and is where the base station places messages such as, for example, pages to alert mobile stations in the serving cell of incoming calls. The downlink traffic channel is the channel in which signals that are, for example, part of an ongoing call are transmitted to the mobile station. The uplink traffic channel is the channel in which the mobile station transmits inbound information as the counterpart to the downlink channel. Together the downlink and uplink traffic channels can be used for a full duplex call, such as a telephone call. A wide variety of communication services can be supported over the traffic channels, such as, for example, dispatch or half duplex calling, packet data network sessions, and so on. Finally, the random access channel 114 is used by all mobile stations to request communication resources. In a conventional communication system, whenever a mobile station needs to set up a communication activity, it sends a request message to the base station. Because there is no coordination among mobile stations, when mobile stations need to engage in a communication activity, their requests arrive at the base station in an unpredictable or random manner in a conventional system. However, according to the invention, the base station transmits or broadcasts a resource indicator message 116 in the broadcast control channel. The resource indicator message informs mobile stations in the serving area as to which communication resources are presently available. The resource indicator message may be transmitted periodically in the broadcast control channel, or a dedicated control channel may be used.

Referring now to FIG. 2, there is shown a chart diagram 200 illustrating information that may be transmitted in a resource indicator message, according to the invention. The chart shown here serves to illustrate an exemplary form of a resource indicator message as contemplated in accordance with the invention, however it will be appreciated by those skilled in the art that the precise embodiment of a resource indicator message may take on a wide variety of forms. In the exemplary embodiment of the resource indicator message, a resource identifier 202 is used to indicate which resource subsequent information pertains. The resource identifier corresponds to a mode of communicating, such as, for example, full duplex voice communication, dispatch or half duplex communication, packet data, and circuit data, to name a few. But, in addition to modes of communicating, the resource identifier can correspond to sub-modes, or different quality levels for each of the various modes.

Associated with each communication resource is an indication of the present availability of each of the resources. In the preferred embodiment the availability is determined by indicating the present number of channels 204 available to support the particular communication resource. Alternatively, the fact that channels are presently available may only be indicated, instead of the number that are presently available. Other information about the present availability or quality of a particular resource may also be broadcast. Additional information may include, for example, the present delay 206, the throughput or bandwidth 208 of the communication resource, and the present packet loss rate 210 associated with the particular communication resource. The delay 206 is a present packet delay indicating, for example, that a certain percentage of packets experience a delay of less than some preselected time.

Communication resources may be provided according to a subscription scheme, where basic communication resources are provided for a low tier subscription plan, and additional communication resources are provided for subscribers of enhanced or high tier subscription plans. The communication system maintains a record of the communication resources each subscribing mobile station is permitted to engage in, and each mobile station is provided with information, such as a file or record in a non-volatile memory, so that the mobile station can decode the resource indicator message, and correlate the available resources with the resources the mobile station is able to engage in according to a subscription plan.

Figures 3, 4:
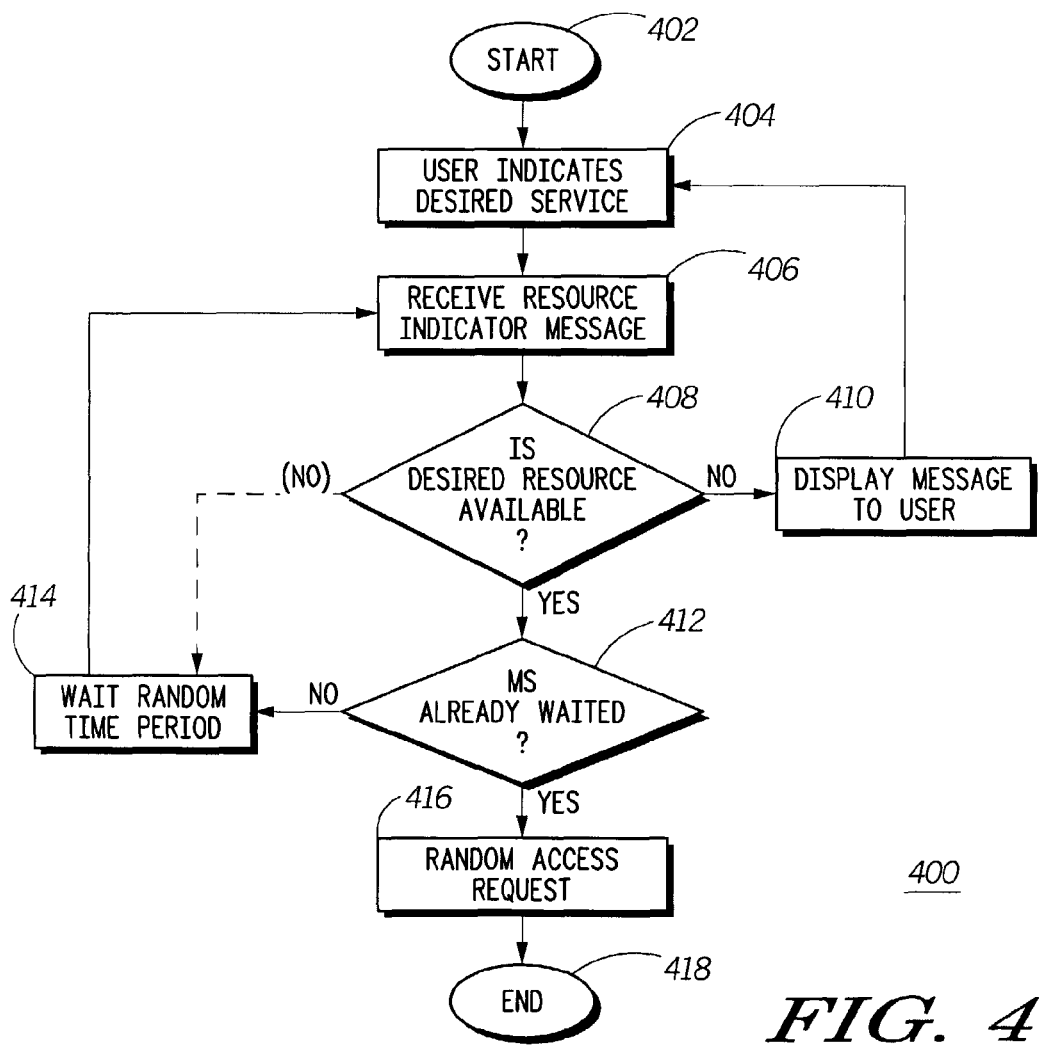
FIG. 3 shows a chart diagram illustrating how a communication resource is specified, in accordance with the invention.
FIG. 4 shows a flowchart diagram of a method for reducing access noise, in accordance with the invention.

Referring now to FIG. 3, there is shown a chart diagram 300 illustrating how a communication resource is specified in accordance with the invention. The diagram shows an exemplary construction of a resource specification and relates a resource identifier 202 with certain physical parameters of the resource. For example, each resource may be specified by a data rate 302, spreading factor 304, and a coding rate 306. The chart shows how the same mode of communication, such as, for example, packet data communication, can have varying levels of quality. For example, packet data communication can be specified at several data rates, each different data rate would, then have a different resource identifier. Similarly, the various voice communication modes may have different quality levels of voice quality specified corresponding to different subscription rates. The mobile station may be provided with a file or record containing information similar to that shown here in order to set various operating parameters properly for the communication service corresponding to the resource identifier.

Referring now to FIG. 4, there is shown a flow chart diagram 400 illustrating a method for reducing access noise in a spread spectrum communication system. At the start 402, the communication system is operating and broadcasting resource indicator messages. A user of a mobile station operates the mobile station (404) to initiate a desired mode of communication. The mobile station receives (406) a resource indicator message. The mobile station may have to operate on the information received such as, for example, decoding the message to obtain the resource availability information. Once the information is received, the mobile station can determine if the desired communication resource is available (408). If the desired communication resource is not presently available, the mobile station may inform the user (410) of the mobile station that the desired communication activity cannot presently be supported due to a lack of available resources. Alternatively, the mobile station may wait a period of time (414) and check the present resource indicator message again. If the desired resource is presently available, as indicated by the present resource indicator message, then in the preferred embodiment, the mobile station determines if it has already been through at least one wait period (412). If not, the mobile station selects a random time period to wait (414), and then it receives a second resource indicator message. By selecting a random time period to wait, the problem of having too many mobile stations requesting resources when a resource becomes available in a serving cell operating at capacity. However, if the mobile station has already waited once, then the mobile station requests access (416) over the random access channel. The process then completes, as is conventional, where the mobile station and base station negotiate and establish the desired communication activity. In an alternative embodiment, the process of waiting a random period of time may be skipped, but in situations where a serving cell as operating near or at capacity, there may be collisions due to users contending for more resources than are available. The time period a mobile station will wait is selected as a matter of engineering design, but it is preferred that the waiting period be no longer than two periods of resource indicator messages. That is, whatever period the resource indicator message is transmitted at, the random time period should be selected from a range of no delay to a delay not exceeding two resource indicator message periods.

Therefore, the invention provides a method for reducing access noise in a spread spectrum mobile communication system which includes broadcasting from a base station on a control channel a resource indicator message for informing a mobile station located in a serving area of the base station the present availability of each of a plurality of communication resources supported by the base station. In the preferred embodiment, the resource indicator is periodically broadcast and periodically updated. The availability of resources can be indicated in the resource indicator message by indicating the present number of channels available, for example. The method reduces access noise because mobile stations receive the resource indicator message prior to attempting to access communication resources. Rather than simply requesting access blindly, the mobile station will not attempt to access communication resources if the resource indicator message indicates the desired resource is not presently available. Furthermore, to avoid access noise bursts when resources become available, mobile stations self-randomize their waiting periods. By broadcasting the resource indicator message to inform both which resources are supported by the base station and their present availability, access noise in general is reduced. The self-randomizing of mobile stations in waiting to access resources reduces access noise when resources become available.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for a mobile station to reduce access noise in a spread spectrum mobile communication system that includes the mobile station and at least one base station, the mobile station being located in a serving area of the base station, the method comprising:
   receiving a first resource indicator message broadcast by the base station, the first resource indicator message indicating an availability of each of a plurality of communication resources supported by the base station;
   determining whether the first resource indicator message indicates that a desired communication resource is available;
   if the first resource indicator message indicates that the desired communication resource is available, waiting a period of time during which the mobile station does not transmit access request messages to the base station;
   after expiration of the period of time, receiving a second resource indicator message broadcast by the base station, the second resource indicator message indicating an availability of each of the plurality of communication resources supported by the base station; and
   if the second resource indicator message indicates that the desired communication resource is still available transmitting a request to access the desired communication resource to the base station.

2. The method of claim 1, wherein the period of time is a random period of time.

3. The method of claim 1, further comprising:
   if the first resource indicator message indicates that the desired communication resource is not available, waiting the period of time; and
   if the second resource indicator message indicates that the desired communication resource has become available, transmitting the request to access the desired communication resource.

4. The method of claim 1, wherein the first resource indicator message includes a plurality of resource identifiers and indicates an availability of the plurality of communication resources supported by the base station and identified by the plurality of resource identifiers, each resource identifier identifying an associated communication resource of the plurality of communication resources and corresponding to a communication mode supported by the associated communication resource, wherein the plurality of communication resources support a plurality of communication modes.

5. The method of claim 4, wherein the resource indicator message further includes at least one of a present number of available channels, a present delay, a present throughput, and a present packet loss for each of the plurality of communication resources, and wherein each resource identifier indicates at least one of a data rate, a spreading factor, and a coding rate for an associated one of the plurality of communication resources.

6. The method of claim 1, wherein the first resource indicator message and the second resource indicator message are received over a broadcast control channel.

7. The method of claim 1, wherein the plurality of communication resources support a plurality of communication services and wherein the plurality of communication services includes full duplex voice communication and packet data.

8. The method of claim 7, wherein the plurality of communication services further includes half duplex voice communication and circuit data.

9. A method for a mobile station to reduce access noise in a spread spectrum mobile communication system that includes the mobile station and at least one base station, the mobile station being located in a serving area of the base station, the method comprising:
   receiving a first resource indicator message broadcast by the base station, the first resource indicator message indicating an availability of each of a plurality of communication resources supported by the base station;
   determining whether the first resource indicator message indicates that a desired communication resource is available;
   if the first resource indicator message indicates that the desired communication resource is not available, waiting a period of time during which the mobile station does not transmit access request messages to the base station;
   after expiration of the period of time, receiving a second resource indicator message broadcast by the base station, the second resource indicator message indicating an availability of each of the plurality of communication resources supported by the base station; and
   if the second resource indicator message indicates that the desired communication resource has become available, transmitting a request to access the desired communication resource to the base station, 10. The method of claim 9, wherein the first resource indicator message includes a plurality of resource identifiers and indicates an availability of the plurality of communication resources supported by the base station and identified by the plurality of resource identifiers, each resource identifier identifying an associated communication resource of the plurality of communication resources and corresponding to a communication mode supported by the associated communication resource, wherein the plurality of communication resources support a plurality of communication modes.

11. The method of claim 9, wherein the period of time is a random period of time.

12. The method of claim 9, wherein the plurality of communication resources support a plurality of communication services and wherein the plurality of communication services includes full duplex voice communication and packet data.

13. The method of claim 12, wherein the plurality of communication services further includes half duplex voice communication and circuit data.

14. The method of claim 9, wherein the first resource indicator message and the second resource indicator message are received over a broadcast control channel.

15. A method for a mobile station to reduce access noise in a spread spectrum mobile communication system that includes the mobile station and at least one base station, the mobile station being located in a serving area of the base station, the method comprising:
   receiving a resource indicator message broadcast by the base station, the resource indicator message including a plurality of resource identifiers and indicating a present availability of a plurality of wireless communication resources supported by the base station and identified by the plurality of resource identifiers, each resource identifier identifying an associated wireless communication resource of the plurality of wireless communication resources and corresponding to a communication mode supported by the associated wireless communication resource, wherein the plurality of wireless communication resources support a plurality of communication modes;
storing a file of resource identifiers for indicating a quality of service associated with each of the plurality of resource identifiers;
if a presently desired wireless communication resource is indicated as being available in the resource indicator message, transmitting a request to access at least the desired wireless communication resource to the base station;
if the resource indicator message indicates that the desired wireless communication resource is not available, waiting a period of time during which the mobile station does not transmit access request messages to the base station;
after expiration of the period of time, receiving a second resource indicator message broadcast by the base station, the second resource indicator message indicating an availability of each of the plurality of wireless communication resources supported by the base station; and
if the second resource indicator message indicates that the desired wireless communication resource has become available, transmitting a request to access the desired wireless communication resource to the base station.

16. The method of claim 15, wherein the period of time is a random period of time.

17. The method of claim 15, wherein the first resource indicator message and the second resource indicator message are received over a broadcast control channel.

18. The method of claim 15, wherein the plurality of communication modes includes full duplex voice communication and packet data.

19. The method of claim 18, wherein the plurality of communication modes further includes half duplex voice communication and circuit data.

* * * * *